Jan. 21, 1930.  F. SCHLAYER  1,744,335
AXIAL THRASHING AND STRAW REDUCING MACHINE
Filed July 24, 1926  5 Sheets-Sheet 1

Inventor:
Felix Schlayer
By Chas. H. Keel.
atty

Jan. 21, 1930. F. SCHLAYER 1,744,335
AXIAL THRASHING AND STRAW REDUCING MACHINE
Filed July 24, 1926 5 Sheets-Sheet 3

Inventor:
Felix Schlayer
By Chas. H. Keel
Atty

Jan. 21, 1930.  F. SCHLAYER  1,744,335
AXIAL THRASHING AND STRAW REDUCING MACHINE
Filed July 24, 1926  5 Sheets-Sheet 4

Inventor:
Felix Schlayer
By Chas. H. Keel
Atty

Jan. 21, 1930.  F. SCHLAYER  1,744,335
AXIAL THRASHING AND STRAW REDUCING MACHINE
Filed July 24, 1926  5 Sheets-Sheet 5

Inventor:
Felip Schlayer
By Chas. H. Keel
Atty

Patented Jan. 21, 1930

1,744,335

UNITED STATES PATENT OFFICE

FELIX SCHLAYER, OF MADRID, SPAIN

AXIAL THRASHING AND STRAW-REDUCING MACHINE

Application filed July 24, 1926, Serial No. 124,734, and in Greece August 7, 1925.

The present invention relates to axial thrashing and straw-reducing machines of the kind in which the materials are thrashed and propelled through the machine in an axial direction, and the invention aims among other things to provide novel and improved feeding arrangements. One of the objects of the invention consists in providing at a point below the level of the bottom of the feeding chute, which may be charged either mechanically or by hand, and at the end next to the machine a descending step or projection leading close up to the beaters. Another object of the invention is to arrange the feeding chute in such manner relatively to the machine and the direction of rotation of the beaters that the lower layers of the incoming material are engaged first by the beaters.

The invention is specially useful in machines in which an annular tossing space is provided surrounding the path of the revolving beaters at the intake end of the machine. In machines of this kind the stepped part preferably projects into the tossing space in form of a descending ridge. The excellent feeding capacity attained thereby is further increased by providing a wedge-shaped projection extending over a part of the circumference of the drum, thereby resticting the tossing space and tending to urge both the air and the materials to be thrashed towards the discharge end of the machine.

The invention further aims to provide novel means enabling the air to enter into the front end of the machine, but preventing it from entering at the discharge end thereof, thus to regulate the duration of the process of thrashing or reducing, and other objects thereof will hereinafter appear. Further objects of the invention are the attachment and formation of certain operative parts of the machine.

The invention is illustrated by way of example in the accompanying drawings, wherein.

In the drawings, 11 is the drum of an axial thrashing and straw-reducing machine having a beater shaft 6 rotating in contra-clockwise direction and having beaters 7 arranged thereon in such a manner as to leave at the intake end an annular tossing space between the outer ends of the revolving beaters and the drum wall. This tossing space is interrupted on the side of the descending beaters by a ridge 80 provided above the horizontal medial plane of the drum and extending through the entire width of the intake 16.

The side $80^1$ of the ridge, which is inclined downwardly into the thrashing zone, and the side $80^3$ are held at an acute angle, both to each other and to the path of the revolving beaters, while the front edge $80^2$ of the ridge is rounded off so as not to have a shearing effect on the straw. Below the ridge 80 the annular tossing space is continued.

The ridge 80, which in the embodiment shown is rigidly connected with the chute 27 and may be detached with it from the drum, is stepped relative to the feeding board $27^2$ of the chute, through which the materials are fed into the machine by hand. The roof $27^3$ of the chute is bent and continued radially inside of the drum where it closely paproaches the beater space. It also serves as upper end wall of a projection 76 beginning in the horizontal centre line opposite the ridge 80 at the front wall of the drum and extending over the roof of the drum as far as the wall $27^1$ of the feeding chute. This projection 76 is attached to the drum 11 direct, its rear part being covered by the wall $11^7$ which is rigidly connected to the roof of the chute. The chute, which is also rigidly connected to the ridge 80, is detachably held in position on the drum at the top by clamping devices $13^1$. At the lower place of connection the part $80^3$ of the ridge 80 is supported on the drum by means of a stiffening angle piece $11^6$ to which it is fastened by means of a spring bolt $11^{61}$ securing chute and ridge in position, and which may be easily disengaged when they art to be removed.

The feeding chute is arranged with reference to the machine and rotation of the beaters so that the lower layers of the incoming material are first engaged and attacked by the rotating beaters and this condition exists with the direction of the bottom of the chute forming a right or greater angle with the tangent to the path of movement of the beaters. In the particular and preferred embodiment shown the bottom or feeding board $27^2$ of the chute is arranged horizontally and in a plane which cuts the beaters when in their vertical position above the shaft substantially midway of their length. Also in this embodiment the feeding board $27^2$ if continued to intersect the beater path would form an angle greater than a right angle, namely, an obtuse angle with the tangent to the beater path, and the feeding chute in this particular embodiment is thus in a direction which approaches a tangential relation with the beater space.

The bend of the upper wall $27^3$ is such that a plane which is tangential to the beater space and opposite the upper part of the intake 16, will cut the step $80^1$ formed by the nose 80.

The side walls $27^4$ of the feeding chute are preferably detachable. If desired only one side wall need be used, which in that case will be adapted to be placed at either side of the chute.

The operation of the machine is as follows:

As the thrashing materials are pushed forward along the feeding board $27^2$ in a direction indicated, the bottom layers of the material are first caught by the beaters 7 and bent across the step, the material thus being prevented from being pushed back into the chute. The lower layers being drawn in with a speed approaching that of the beater movement, the upper layers are compelled to follow and the bundle will thus be stretched and evened out. In that way large quantities of materials, even if fed irregularly into the machine, can be treated by the latter. Below the ridge 80 the materials are then subjected to intense agitation in the tossing space, whereupon they pass along a corrugated bottom grate to the projection 76. As a result of both the immediate mechanical effect and the effect of the air, the grain will be deflected by this projection towards the discharge end of the machine. The axial deflection is further accelerated by the helical arrangement of the beaters 7 and by the beater tools and abutments (not shown) which are fixed to the drum. The deflection of the materials is so strong that they will normally be removed from the feeding zone during the first revolution. Grains which may be thrown by the beaters against the intake will be caught by the step of the ridge and swept along by the oncoming materials, thus being taken back into the thrashing space.

The machine may be attended by one operator standing either at the front end of the feeding board $27^2$ or at one of its sides; in the latter case one of the side walls $27^4$ will be removed. If two attendants are employed they will stand at opposite sides of the board and both side walls $27^4$ will be removed.

When the machine is to be transported the feeding chute is removed therefrom. The detachable arrangement of the chute also enables the latter to be replaced by a mechanical feeding device represented diagrammatically in Fig. 3. In this figure, $27^5$ is an endless feeding apron, at the delivery end of which a chute $27^2$ leading to the ridge 80 may be provided.

Figures 1, 3:
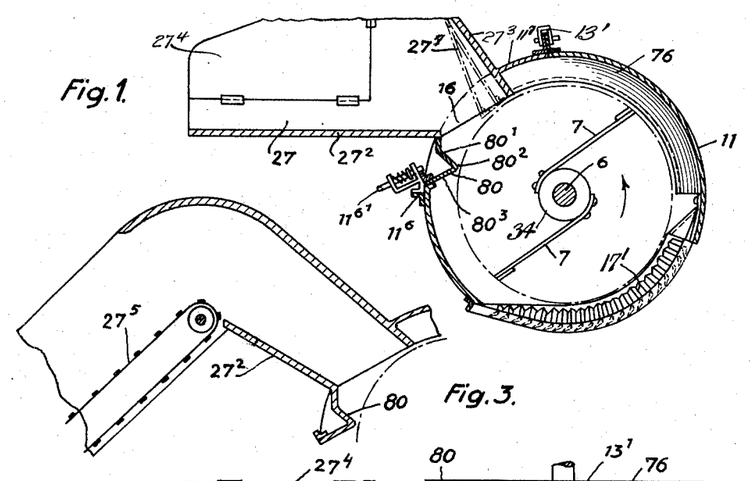
Fig. 1 is a vertical section through the machine, taken on line I—I of Fig. 2.
Fig. 3 is a detail view.
Figures 2, 4:
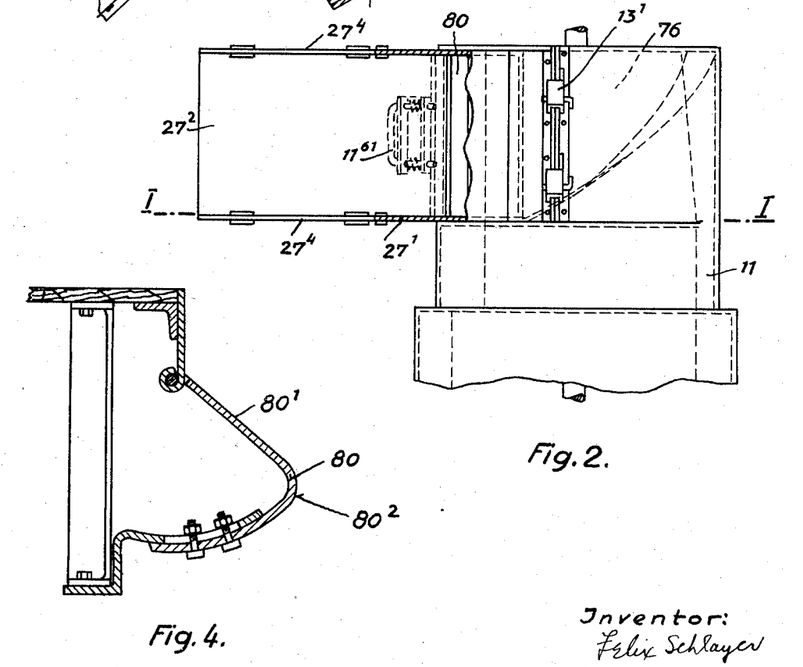
Fig. 2 is a plan view of the machine.
Fig. 4 is an enlarged sectional view of a detail.

As shown in Fig. 1 plates $27^7$ may be provided in the chute for regulating the height of the intake opening 16 and thereby adapting its capacity to the available power. Similar means may be provided for regulating the width of the intake opening. According to Fig. 4 the ridge 80 is adjustable by means of a hinge and screw-clamps, so as to vary the position of the rounded edge 80 with regard to the beaters or the feeding board $27^2$, respectively. If desired, means may also be provided for varying the distance between the ridge 80 and the feeding chute.

The arrangement of the feeding board relative to the beater path, whereby the materials are fed in a direction at a right or obtuse angle as above indicated with regard to the part of the circumferential beater path lying immediately in front of the intake, so as to cause the lower layers to be caught first, is novel and is also applicable to axial thrashing machines in which the beaters, at the intake end of the machine cooperate with the wall of the drum or pass close by or mesh with the abutments fixed on the drum wall.

As shown in Figs. 5–8 a further ridge 84 projecting so as closely to approach the path of rotation of the beaters 7, may be provided at the intake end I of the machine, immediately before the sieves or grates, without departing from the scope of the invention. This ridge 84 is preferably provided with baffle plates 85 or with an otherwise suitably roughened surface which will assist in stripping the grain off the ears. In addition to producing a thrashing effect the ridge 84 is intended to catch the materials descending in heavy swaths from the intake ridge 80, and to divide them into thinner layers before they pass onto the corrugated grate $17^1$. It also serves the purpose of giving the materials, which descend vertically, a more or less horizontal position, i. e. one concentric with the receiving surface of the grates, so as not to get caught in them but to pass along without disturbance.

Figure 5:
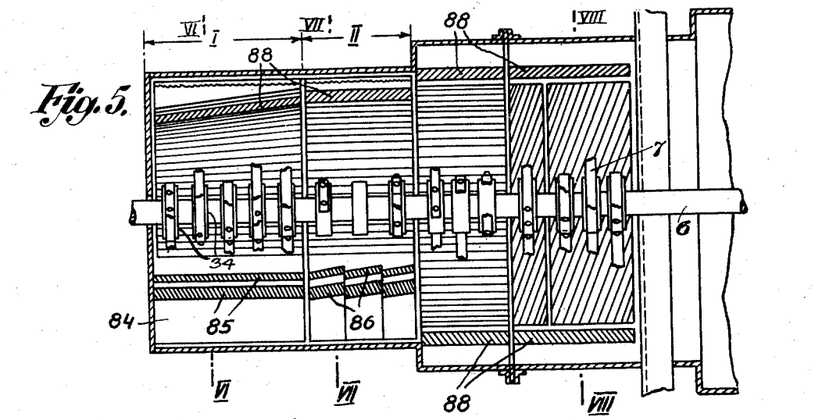
Fig. 5 is a horizontal longitudinal section through an axial thrashing or straw-reducing machine provided with additional ridges.
Figures 6, 7, 8:
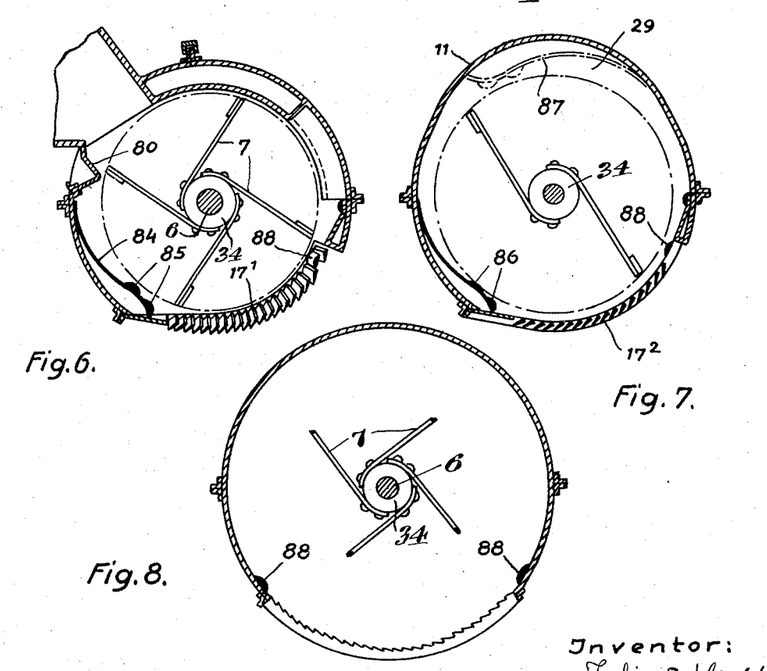
Figs. 6, 7, and 8 are sections on lines VI—VI, VII—VII, and VIII—VIII, respectively, of Fig. 5.

From Fig. 5, in connection with Figs. 7 and 8, it appears that such a ridge may also be provided inside of and beyond the thrashing zone proper II. In the thrashing zone the ridge is preferably arranged in steps 86 which descend towards the intake end of the machine, i. e. they are arranged in a direction opposed to that in which the materials are being propelled. The position of the ribs of the baffling plates is also opposed to the direction of feed of the materials, so as to enable the stripped grains to roll back towards the intake end of the machine. The ridge in the thrashing zone answers exactly the same purpose as that in the intake zone. In addition it is intended to offer a certain braking resistance to the materials and to hold back the grains which may be flying around so as to prevent them from being propelled too fast towards the discharge end of the machine. The result will be greater accumulation of the grain in the thrashing zone proper of the machine. The braking effect of the steps will cause the material being revolved inside of the drum to be retained for a longer period in the thrashing zone and to be subjected in the most efficient manner possible to a stripping and subsequent straining action.

One or more similar ridges 87 may be provided at other places of the thrashing machine, for instance under the roof of the drum 11, or inside of the buffer-room 29 which is an enlargement of the drum which has been given an oval section at this place. Some ridges or thrashing plates 88 are preferably also provided at the rear edges of the grates $17^1$, $17^2$. In general it appears advisable to provide such projecting friction-producing ridges 88, which may also be replaced by baffle-plates, both at the front and rear edges of the grate or gratelike devices.

It has been found desirable to employ in the preliminary thrashing zone I, four or five helical rows of beaters 7 (see Fig. 6), while in the principal thrashing zone II only two rows of beaters are employed (Fig. 7). The larger number of beater rows in the preliminary zone I, will result in a more efficient catching and thorough thrashing from the very beginning, because the materials will be fed along in thinner layers. This has also the further advantage of a more uniform consumption of power, for when feeding the machine by hand it will no longer be possible to push whole sheaves into the machine, which would use up a great deal of power until they be completely torn apart. The uniform feeding of the materials in thin layers does not cause any decrease in efficiency, these layers being naturally dealt with much more speedily.

The underlying principle when using a greater number of beater rows in the preliminary thrashing zone I is to have there, as well as at the discharge end of the machine (Fig. 8) a larger number of beaters, while in the intermediate zones (Fig. 7) a smaller number is preferably used. The employment of a small number of beaters or beater sets in an intermediate portion of the machine may be effected in any desirable and suitable manner, as for example by providing fewer beater carriers or by omitting to provide one or more beater carriers with beaters.

This new improved machine is based on the principle that its effect no longer depends so much on merely agitating the materials in a free annular space, but rather upon creating a continuous series of thrashing places, by providing abutments and projections in addition to the beaters. In connection therewith the number of blows dealt in this space in a unit of time, in other words the number of beater-rows, is of much greater importance than it was in constructions hitherto known, where the main object was to toss about the materials in the drum, and where the number of beaters was, therefore, of secondary importance only.

The change from a larger to a smaller number of beater rows may, of course, be effected two or three times in one and the same machine; and the above indicated ratio of 4 or 5 to 2 may also be varied at will.

As the feeding has been greatly improved by the provision of the ridge 80, special measures must be taken for the admission of air into the interior of the drum. When feeding slowly sufficient air will be admitted through the intake opening, air being allowed to enter between each two sheaves. If, however, thanks to the ridge 80, the materials are being caught and fed along without interruption, and the materials together with the air being further propelled or thrust along rapidly, then other parts of the machine must be arranged for the admission of air. In accordance with the present invention the apertures serving as outlets for the grain will at the same time act as air-inlets. For this purpose they are given the shape of nozzles through which the air may be sucked in by the revolving operative tools. This special feature of the invention is represented in Figs. 9–16.

Secured tangentially to carriers 34 of comparatively large diameter, which are keyed to the beater shaft 6, the beaters 7 are arranged in helical rows and fitted at their outer ends with beating tools. In the preliminary thrashing zone I and in the principal thrashing zone II, the beating tools are composed of ribbed shoes $37^2$ of different width. The shoes of the first pair of beaters are shovel-shaped and set obliquely so as to propel the materials towards the discharge end of the machine. In the straw-reducing zones III and IV the beating tools have the shape of forks $37^3$ and $37^5$, respectively, the prongs of the forks being preferably serrated like saws, and abutments of corresponding shape being secured to the drum-wall. In zone III the abutments $8^5$ are preferably arranged between the beater paths, while in the principal reducing zone IV the prongs of the abutments $8^5$ mesh with the three prongs $37^5$ of the revolving beater tools.

In zones I and II, and preferably also in zone III, the bottom $17^0$ of the drum 11 presents to the materials a corrugated operating surface, the corrugations running substantially parallel to the beater shaft. In the furrows between the crests there are slots or apertures through which the stripped grain is discharged.

Figures 11, 12, 13, 14, 15, 16, 23, 24:
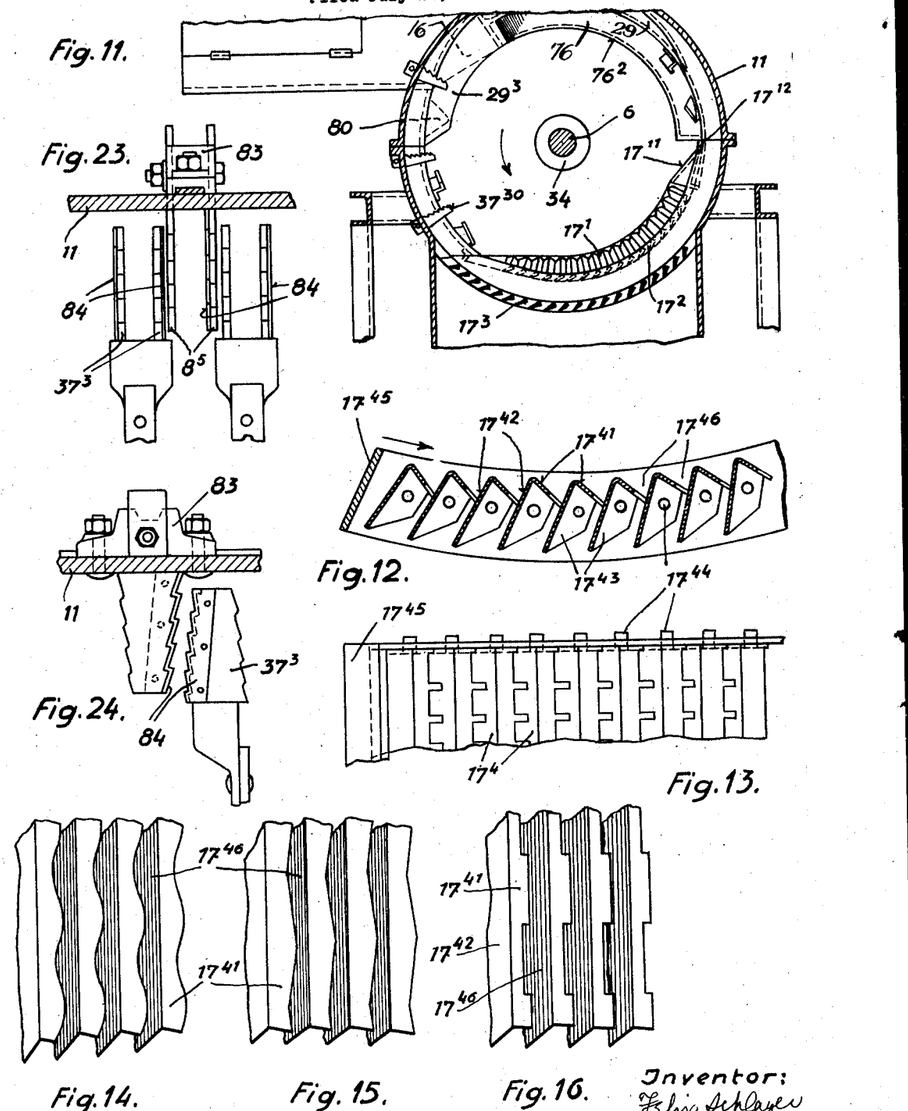
Fig. 11 is a cross section on line XI—XI of Fig. 9.
Fig. 12 is an enlarged sectional view of a grate structure forming the bottom of the machine.
Fig. 13 is a plan view of the same.
Figs. 14–16 are plan views of different modifications of the grate structure.
Figs. 23, 25 and 26 are front views of various modes of securing cutters to the operative parts.
Fig. 24 is a side view of Fig. 23.

The corrugated drum bottom or grate may be of any suitable corrugated structure with the nozzle-like apertures passing through the furrows between the crests but is preferably composed of a grate structure the formation of which is illustrated on an enlarged scale in Figs. 11 and 12. The grate consists of plate strips $17^{42}$, the upper edges $17^{41}$ of which are bent off at an acute angle to form the corrugations. The ends of the strips are bent off at right angles to form brackets $17^{43}$ whereby the strips are fastened to a supporting frame $17^{45}$ by means of rivets or screws $17^{44}$. The grate bars thus formed may be adjusted about the rivets $17^{44}$ in order to regulate the size of the slots $17^{46}$ through which the grain is discharged. This adjustment may be effected either direct by hand or by means of a device acting on all the bars simultaneously. The bars are preferably set in such manner that the strips $17^{42}$ will form an acute angle with the path of rotation of the approaching beaters (Fig. 12) while the short strips $17^{41}$ form an acute angle with the wider strips. As illustrated in Figs. 14 to 16, the short webs $17^{41}$ of the metal strips may be waved or notched in any way deemed appropriate in order to provide slots of uneven width. In both the thrashing zones I and II the room between the path of the revolving beaters and the drum wall is partially taken up by an annular space of considerable depth in which the materials may be thoroughly tossed and agitated. The outer ends of the beaters are, therefore, about equidistant from the shaft 6, in each zone. In the preliminary thrashing zone I the corrugated bottom $17^1$ is of conical shape, the end adjoining the end wall $11^0$ of the machine drum being in pretty close proximity to the beater path, the other end being separated from the shaft by about the width of the beater space, and preferably joined to the bottom $17^2$ of the principal thrashing zone II without forming any step. As shown in Fig. 11, the leading part of the corrugated bottom surface $17^1$ is substantially plane and carried into and through the thrashing space in a direction substantially parallel to the tangents of the rotating path of the beaters; towards the rear it gradually bends upwards to form a cone concentric with the shaft 6 until it joins a guide surface $17^{11}$ which is inclined towards the drum wall 11. The formation of the bottom $17^2$ of zone II is similar to the one just described and substantially concentric with the beater shaft.

The restriction of the tossing space produced by the corrugated bottom $17^1$ prevents the accumulation of straw or grains and the consequent clogging up of the discharge slots $17^{46}$ for the grain, which might otherwise occur diametrically opposite the intake 16, while in the machine according to the invention they will always be free for the passage of the grain.

A grooved thrashing bar $17^{12}$ is arranged along the drum wall above the guide surface $17^{11}$, and above the latter, extending over the roof of the drum, is the wedge-shaped projection 76 which closely adjoins the front wall $11^0$ of the machine and whose inner surface $76^2$ almost touches the rotating path of the beaters. Just below the intake 16 the ridge 80 projects into the tossing space. The gap between the ridge 80 and the projection 76 is closed up towards the main part of the machine by a wall $29^3$ standing at a right angle to the shaft 6.

In the thrashing zones I and II the beaters 7, which are longer in zone II than in zone I, cooperate with scoop-shaped abutments $8^2$ and $8^3$ fastened to the drum wall. In order to provide a buffer-room in which the materials can be distributed the roof of zone II, as stated above, is raised to the level of the preliminary reducing zone III, thereby giving it an oval section and producing a pocket 29 in which the materials may spread.

The machine operates by attacking the materials as they are fed in through the intake 16 and driving them past the ridge 80. The materials approach the beaters across the ridge 80, below which they are hurled against the abutments $8^2$ in the tossing space. There the grain is stripped from the ears and, owing to its greater density, separated from the straw by centrifugal force. It is caught by the corrugated bottom $17^1$ and discharged through the slots $17^{46}$, while the straw follows the beaters along the grate bars and up to the drum wall. Owing to the corrugated nature of the bottom $17^1$ and to the resistance it consequently produces, the bottom assists in stripping off the grain. Grain which happens to be hurled by the beaters against the side of the drum, will be guided back by the inclined surface $17^{11}$, to the grate through which it will be discharged. Beyond the horizontal medial plane the annular tossing space widens again and further thrashing takes place. At the same time the materials will be caught by the projection 76 and carried off by the aid of the latter towards the end of the machine into zone II, the beaters thus being free to treat a fresh charge of materials received from the intake 16. The wall $29^3$ serves the purpose of leading the materials past the intake 16.

The required air will be sucked in through the nozzle-shaped apertures $17^{46}$ of the grate by the revolving beaters, whose action might be compared to that of a blast. This offers a further advantage, inasmuch as this air will have a cleansing effect on the discharged grains, since straw, chaff, and dust will be blown back into the drum, while the grain will be discharged. The materials will, as it were, be held between two air cushions, the outer one of which attempts to penetrate the straw cylinder which has formed inside of the drum, thus keeping the straw sufficiently loose to allow the grain to fall through easily.

The rapid axial deflection of the materials towards the discharge end of the machine brought about by the projection 76, by the helical arrangement of the beaters, and by the oblique position of the beater tools and abutments, is still increased by the conical shape of the grate bottom $17^1$ and its tangential approach to the beater space. The inclined arrangement of the grate, in combination with the oblique position of the grate bars enables the materials easily to slide along towards the discharge end of the machine.

As shown in the drawings the grates $17^1$, $17^2$, and $17^3$ are preferably fitted up in separate frames $17^{45}$ which are detachably secured to the machine, so that they may be easily exchanged. The grate bars $17^4$ are preferably adjustable.

The discharge of the grain through the furrows of the grates might be further facilitated by giving the grate bars on the ascending part of the grate a different position relative to the frame members than to the bars on the horizontal part.

Figure 9:
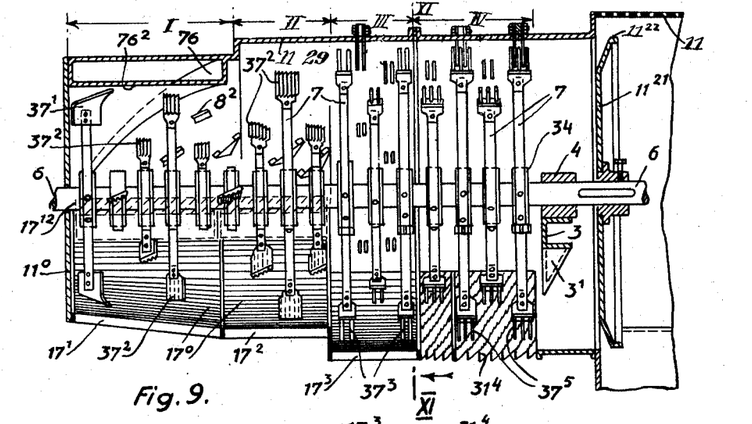
Fig. 9 shows a vertical longitudinal section through a modified construction of the machine.
Figures 10, 17:
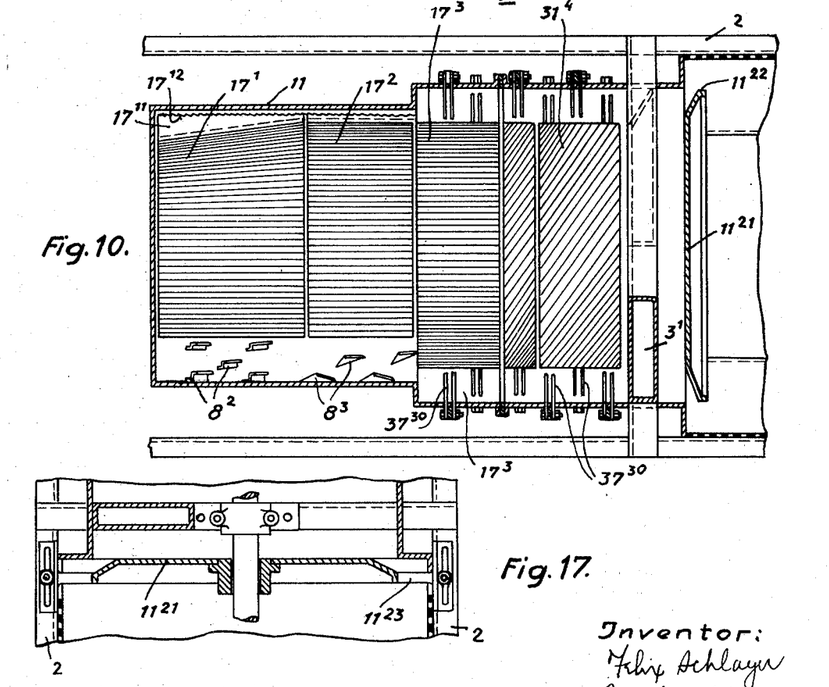
Fig. 10 is a horizontal longitudinal section through the same, the beater shaft being omitted.
Fig. 17 shows a modification of the discharge end of the machine according to Fig. 9.

The discharge end of the machine has been specially designed with the end in view to enable the air freely to pass through the grate bars and to prevent air from entering at the discharge end of the machine. As shown in Figs. 9 and 17, the discharge end of the machine is closed by a circular plate $11^{21}$ which is slidably mounted on the shaft 6 so that it may be adjusted on the latter in an axial direction, it being normally secured in its position by means of a set-screw. The rim $11^{22}$ of this solid disk is inclined so as to give it the shape of a truncated cone whose convex surface is turned towards the drum. The disk will be normally so positioned as to leave between it and the drum an annular slit through which the materials may be discharged.

The axial displacement and adjustment of the disk $11^{21}$ on the shaft 6 may for instance be effected by means of a cotter and screw. In that case the disk will rotate with the shaft. If the disk is not intended to rotate it will be adjustably secured to the machine frame 2 by means of two arms $11^{23}$, as shown in Fig. 17; in that case the disk will be slidably mounted on the shaft 6.

Behind the discharge end of the machine there is an extension of the drum which is, however, of larger diameter than the drum proper and which serves the purpose of catching or collecting the thrashed materials which have been discharged through the annular slit, and thereupon deflecting them downwards onto a shaker, (not shown).

In case a shaft-bearing 4 carried by a girder 3 extending through the entire machine, is provided on that side of the disk $11^{21}$ facing the machine, it will preferably be provided with wedge-shaped structures $3^1$ covering the whole width of the girder 3 and deflect the reduced materials towards the discharge end of the machine.

The use of an axially adjustable solid end wall offers the possibility of discharging the reduced materials in form of a thin annular film at the end of the drum, and thus placing the discharge completely beyond the suction zone established in the interior of the machine. It has been observed that both the capacity of the intake and the performance of the reducer are excellent when no air is being admitted at the discharge end. The admission of air at that place would tend to disturb the entrance of air through the grates 17¹, 17², 17³. According to the adjustment of the end wall the straw will remain for a longer or shorter period of time inside of the machine, which will result in a more or less complete reduction of the straw.

Further improvements of the machine have been made with regard to the formation of the working tools or referring to the change in the relative cooperation of the fixed and the revolving tools.

Figure 18:
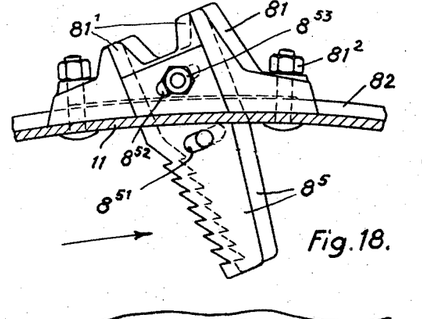
Figs. 18–22 show two modifications of fastening means for the operative parts of the machine, Figs. 18–20 being an elevation, a side and a plan view, respectively, of one embodiment of fastening means for the operative parts of the drum wall, and Figs. 21 and 22 showing, in elevation and plan view, respectively, another modified form.
Figure 19:
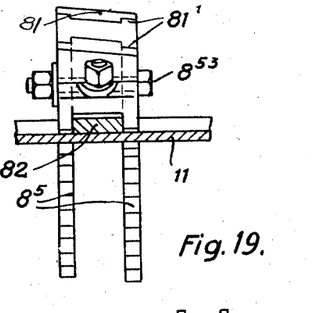
Figure 20:
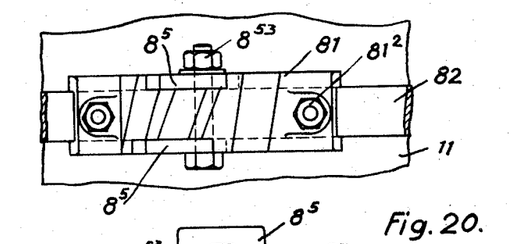

Of primary importance is the formation of the fixed working tools or abutments, i. e. the devices which are adjustably secured to the drum. As shown in Figs. 18—20 the fixed preliminary reducing knives 8⁵ end in a broad shank penetrating the drum wall 11 and resting in lateral grooves 81¹ provided in supports 81. The latter are fastened by means of screws 81² to bands or hoops 82 surrounding the machine. The grooves are arranged in staggered relation corresponding to the helical feeding motion of the thrashing materials, so that the knife nearer the discharge end of the machine will stand farther back than the knife nearer the intake end. In view of the length of the straw to be treated in the preliminary reducing zone the knives are given an inclined position thereby causing the revolving tools, which arrive in the direction of the arrow (Fig. 18), first to engage the teeth next to the drum.

Figure 21:
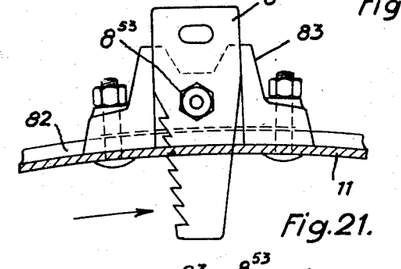
Figure 22:
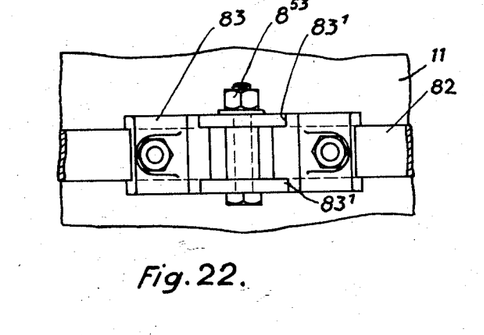

The knives are fastened by means of screws 8⁵³ passing through two oblong holes 8⁵¹ and 8⁵², provided in the knives, and also through a bore provided in the support 81. By the oblong shape of the holes 8⁵¹ and 8⁵² the knives are enabled to be used in the principal reducing zone also, where they are arranged radially instead of staggered, as will appear from Figs. 21 and 22. The supports 83 employed in the principal reducing zone of the machine are accordingly provided with radial grooves 83¹. In the position occupied in Figs. 18 and 19 the knives 8⁵ of the preliminary reducing zone are effective in their entire length, the set-screw 8⁵³ being passed through the upper holes 8⁵². According to Fig. 21 the knives 8⁵ of the principal reducing zone occupy a less effective position, the screws being passed through the holes 8⁵¹ which are nearer the cutting edges. On the other hand the knives employed in the preliminary reducing zone may be adjusted so as to decrease, and those of the principal reducing zone so as to increase their effective length. The fixed tools of the thrashing zones may be similarly adjusted. The knives in the principal reducing zone may, of course, also be arranged to correspond to the helical propelling movement of the thrashing materials. When using the supports illustrated in Figs. 18 to 22 the oblong holes can be dispensed with, provided special knives are employed for each kind of frame.

For the sake of quick and inexpensive production the above described reducing knives 8⁵ are frequently made of sheet-iron strips having their effective edges serrated like saws. In order to secure the desired strength these strips must be of sufficient thickness which, even though not very great, will yet prevent a sharp cut from being made with a minimum of energy. In accordance with the present invention the tool has been improved so as to serve merely as carrier for a thin projecting cutter which is made of higher grade material, such as a saw-blade for instance. This improvement has the advantage of reducing the force required to actuate the tool, while at the same time improving the quality of the chopped material. By the cooperation of the blunt operative bodies provided with the cutting tool which will splittingly slash open the straw blades, the materials will be softer and disintegrated to a stronger degree.

In Figs. 23 and 24, in which one embodiment of the invention is shown in front and side view, respectively, the working tools have two prongs each, the revolving tools 37² being carried by an arm 7, while the abutments 8⁵ are fastened to supports 83 on the drum wall 11. All of the prongs have a serrated working area. Some of the prongs are provided with a lateral thin cutting tool which may be riveted or otherwise suitably fastened to its carrier. This cutter may consist of a sharp saw-blade whose teeth correspond to the teeth of the prongs, but will project a few millimeters. The succession of the cutting tools in the axial direction of the machine depends upon the desired grade of reduction. Generally it will suffice to provide one of two cooperating fixed and revolving prongs with a cutting tool.

Figure 25:
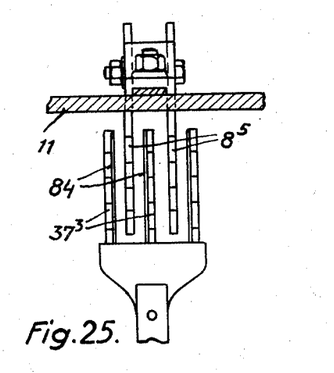
Figure 26:
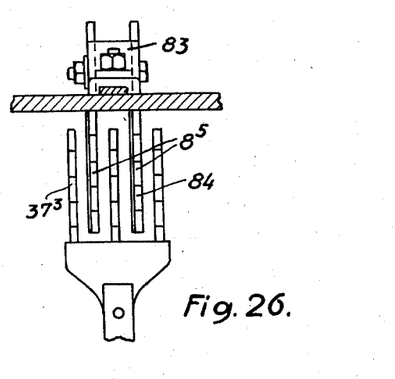

In Figs. 25 and 26 a two-pronged fixed working tool 8⁵ cooperates with a three-pronged revolving cutter 37³; in Fig. 25 the revolving, and in Fig. 26 the fixed prongs being fitted with cutting edges. These cutting edges 84 may, if desired, also be cut into the parts 8⁵ or 37³ direct, or they may be rigidly connected to them by casting, welding, or the like. The zig-zag formation of the parts 8⁵ and 37³ facilitates the slashing and softening of the straw, has, however, no influence upon the manner of working of the cutting tools.

Having thus described my invention, what I claim as new and desire to secure by Letters Patent is:—

1. In an axial thrashing or straw-reducing machine the combination of a rotor including a plurality of beaters, a casing for said rotor, a feeding chute leading toward the beater space and in a direction opposite to rotation of the beaters the arrangement being such that the beaters first engage the lower layers of the advancing materials and a cooperating step or projection disposed below the level of the inner end of the chute bottom, said step or projection extending to a point in proximity to the cylindrical beater space.

2. In a machine of the character set forth in claim 1 wherein the step or projection is inclined downwardly towards the thrashing space.

3. In an axial thrashing or straw-reducing machine the combination of a rotor element including rotary beaters revolving in a beating space, a casing surrounding said rotor, a feeding chute leading toward the beating space and in a direction opposite to the direction of rotation of the beaters the bottom or feed board thereof terminating short of the beating space and the direction of the inner end of the chute bottom forming at least a right angle with the tangent to the beater path, the casing below the level of said feed board having a free space therebetween and the rotating beaters, and a step or projection disposed in said free space and projecting to a point in proximity to the rotary beating members.

4. In a machine of the character set forth in claim 3 wherein the space between the rotary beaters and the casing in advance of the intake chute is restricted for the purpose of assisting in deflecting the air and the thrashing materials toward the discharge end of the machine.

5. In a machine of the character set forth in claim 3 wherein the roof of the feeding chute adjacent the inner end thereof is formed substantially as a radial wall.

6. A machine of the character set forth in claim 3 wherein means are provided for varying the effective outlet area of the feeding chute.

7. In a machine of the character set forth in claim 3 wherein the feeding chute and the step or projection are so arranged that a plane which is tangential to the path of rotation of the beaters and lies opposite the upper part of the intake area passes through said step or projection.

8. In a machine of the character set forth in claim 1 wherein the step or projection is adjustable relatively to the beaters.

9. In a machine of the character set forth in claim 1 wherein the feeding chute is attachably and detachably connected with the machine, together with the step or feeding projection which forms a part thereof.

10. In an axial thrashing or straw-reducing machine the combination of a rotor including a plurality of beaters, a casing for said rotor, a feeding chute leading into the beating space and in a direction opposite to the rotation of the beaters and a cooperating step or projection disposed below the level of the inner end of the chute bottom, said step or projection extending to a point in proximity to the beater path, said feeding chute and cooperating step being attachably and detachably connected with the machine casing as a unit and at least one side wall of said chute being separately detachable.

11. In an axial thrashing or straw-reducing machine the combination of a rotor element including rotary beaters revolving in a beating space, a casing surrounding said rotor, a feeding chute leading into the beating space whose bottom or feed board terminates short of the beating space, a free whirling space being disposed between the path of the beaters and the casing at the intake end of the machine, a step or feeding projection disposed in said free space at a point just below the level of the feeding chute and projecting to a point in proximity to the rotary beating members, and one or more friction producing projecting surfaces disposed within the free beating space.

12. A machine of the character set forth in claim 11 wherein the friction producing surface consists of a smooth surface provided with ridges or baffle strips fastened thereon.

13. A machine of the character set forth in claim 11 wherein the friction producing surface is stepped in the direction of the machine axis and inclined so as to exert a braking effect on the materials being thrashed.

14. A machine of the character set forth in claim 11 wherein sieves are provided and the friction producing members are channelled relatively to the feeding motion of the materials being thrashed so that the grain will run into the sieves in a direction towards the intake end of the machine.

15. In an axial thrashing or straw-reducing machine the combination of a rotor including a plurality of beaters, a casing for said rotor, the beaters being arranged in helical rows, the number of helical rows being different at different zones of the machines, a feeding chute leading into the beater space and in a direction opposite to the rotation of the beaters and a cooperating step or projection disposed below the level of the inner end of the chute bottom, said step or projection extending to a point in proximity to the cylindrical beater space.

16. In a machine of the character set forth in claim 15 wherein the number of beater rows in the intake zone of the machine is greater than in the zone immediately succeeding the intake zone.

17. In a machine of the character set forth in claim 15 wherein a greater number of helical rows of beaters is provided at the intake and discharge ends of the machine than in an intermediate zone.

18. In an axial thrashing or straw-reducing machine the combination of a rotor including a plurality of beaters, a casing for said rotor, a feeding chute leading into the beater space and in a direction opposite to rotation of the beaters and a cooperating step or projection disposed below the level of the inner end of the chute bottom, said step or projection extending to a point in proximity to the beater path, and said casing having a corrugated part with apertures formed therein for the passage of the grain and are so formed that they act as air nozzles through which air may be drawn in by the rotating elements.

19. In a machine of the character set forth in claim 18 wherein the corrugated part of the casing having the nozzle-shaped apertures is composed of members running parallel to the machine shaft and having an angular section, the apex of which angular section points toward the shaft of the machine and furrows for the separation of the grain and the nozzle-like apertures being formed between each two members.

20. In a machine of the character set forth in claim 18 wherein a part of the corrugated grate structure of the casing containing the nozzle-like apertures is disposed approximately diametrically opposite the feeding chute and occupies a fairly large segment of the annular free space between the beaters and the casing wall.

21. In a machine of the character set forth in claim 18 wherein the leading part of the corrugated grate structure of the casing surrounding the rotor is substantially a plane surface beginning from the casing wall, while the rear or trailing part thereof forms a curve substantially concentric with the beater space and is joined to the wall by means of an inclined guide surface.

22. In a machine of the character set forth in claim 18 wherein the corrugated grate structure is a segment of frusto-conical shape receding from the beater shaft in the direction of the axial feeding movement of the materials.

23. A machine of the character set forth in claim 18 wherein the corrugated grate structure at the intake end of the machine is in the form of a segment of a frusto-conical shape receding from the beater shaft in the direction of the axial feeding movement of materials and connected with a cylindrical grate adjacent the intake zone to form a substantial continuation thereof.

24. In an axial thrashing or straw-reducing machine the combination of a rotor element including rotary beaters revolving in a beating space, a casing surrounding said rotor, a feeding chute leading into the beating space, an annular free whirling space being provided between the rotary beaters and the casing at the intake end of the machine, said casing having a corrugated structure disposed within said free whirling space and having nozzle-like apertures for the passage of grain in one direction and air in the other direction, and said corrugated grate structure being of frusto-conical shape with the end of small diameter adjoining the front wall of the machine brought fairly close to the beater path while the rear end of the conical grate structure recedes from said beater path by substantially the depth of the annular free whirling or tossing space.

25. In an axial thrashing or straw-reducing machine the combination of a rotor including a plurality of beaters, a casing for said rotor, a feeding chute leading into the beater space and in a direction opposite to rotation of the beaters and a cooperating step or projection disposed below the level of the inner end of the chute bottom, said step or projection extending to a point in proximity to the cylindrical beater space, and a corrugated grate structure disposed within the casing in the thrashing and preliminary straw-reducing zones, such grate structure being composed of members running parallel to the machine axis and having an angular section, the apex of which angular section points approximately towards the machine axis and furrows together with nozzle-like apertures for the passage of air and grain in the opposite directions being formed between each two members.

26. A machine of the character set forth in claim 25 wherein the width of the gaps between the two adjacent parallel members of the corrugated grate structure varies in the longitudinal direction thereof.

27. In a machine of the character set forth in claim 25 wherein the webs of the grate members are of unequal width.

28. In a machine of the character set forth in claim 25 wherein the grate is divided into individual sections each being attachably and detachably connected to the machine casing as a unit by means of a special frame.

29. A machine of the character set forth in claim 1 wherein the outlet end of the casing is provided with a solid wall with an annular discharge opening between the outer part of the end wall and the machine casing.

30. A machine of the character set forth in claim 1 provided with a solid end wall at the outlet end of the machine which is in the form of a circular disc mounted on the machine shaft and adjustable in an axial direction with an annular outlet space between the disc and the casing.

31. In a machine of the character set forth in claim 1 provided with an end wall at the outlet end in the form of a circular disc with an annular outlet space disposed between the periphery of the disc and the machine casing, the rim of the end disc member having the form of a truncated cone whose convex surface is turned toward the machine casing.

32. In a machine of the character set forth in claim 1 wherein the casing is provided with an extension at the outlet end of larger diameter than the main body portion thereof and a solid end closure for the casing disposed within the extension, but provided with an annular space disposed therebetween and the casing proper for the purpose set forth.

33. In a machine of the character set forth in claim 1 provided with an end wall at the oulet end of the machine with an annular outlet opening between the end wall and the machine casing, together with a bearing between the end wall and the thrashed or reducing zone of the machine, said bearing being carried by a girder provided with wedge-shaped guide pieces adapted to deflect the reduced materials towards the annular discharge opening.

34. In an axial thrashing or straw-reducing machine, the combination of a rotor including a plurality of beaters, a casing for said rotor and fixed tools or abutments carried by said casing and cooperating with the beaters, said fixed tools comprising shanks and the casing being provided with supports having lateral grooves for the reception of the shanks, said shanks being adjustably mounted within the supports.

35. In a machine of the character set forth in claim 34 wherein the fastening or receiving grooves of the supports for the fixed tools are substantially radially disposed in one part of the machine, while those in another part are inclined to the radial position.

36. A machine of the character set forth in claim 34 wherein the rotary beaters are arranged in helical paths and the fixed cooperating members are arranged in staggered relation thereto.

37. In a machine of the character set forth in claim 34 wherein the supports for the fixed tools are carried by hoops passing around the outside of and reinforcing the casing.

38. A machine of the character set forth in claim 34 wherein the fixed cooperative parts consist of a narrow bottom part and a sharp cutter projecting in the form of a step.

39. In a machine of the character set forth in claim 34 wherein the bottom part of the fixed cooperating tools is provided on one or both sides with a saw-blade or blades disposed at right angles to the machine axis.

40. In a machine of the character set forth in claim 34 wherein of each pair of fixed and revolving cooperating reducing tools, one of them is provided with a projecting cutting edge.

41. In a machine of the character set forth in claim 3 wherein the bottom of the feeding chute lies at about half the height of the beaters that cut the plane of the feeding board vertically.

42. A machine of the character set forth in claim 11 wherein part of the surrounding casing is formed by sieves and the friction producing projections are arranged at least in front of the front edges of said sieves.

43. A machine of the character set forth in claim 18 wherein the corrugated part of the casing having the nozzle shaped apertures is provided in the thrashing zone and the preliminary reducing zone of the machine, while a serrated grate is provided in the principal reducing zone.

44. A machine of the character set forth in claim 1 provided with a solid end wall at the outlet end of the machine which is in the form of a circular disc mounted on the machine shaft and adjustable in an axial direction with an annular outlet space between the disc and the casing.

45. In an axial thrashing or straw reducing machine the combination of a rotor element including rotary beaters, a casing surrounding said rotor element, with a beating space disposed between the path of the rotary beaters and the interior of the casing at the intake end of the machine, and one or more friction producing devices disposed within said beating space.

46. A machine of the character set forth in claim 45 including sieves disposed behind the friction producing devices.

47. In an axial thrashing or straw reducing machine, the combination of a rotor including a plurality of beaters, a casing for said rotor, the beaters being arranged in helical rows with the number of helical rows being different at different zones of the machine, the number of beater rows in the intake zone of the machine being greater than in the intermediate zone.

48. A machine of the character set forth in claim 47 wherein a greater number of helical rows of beaters is provided at the intake and discharge ends of the machine than in the intermediate zone.

49. In an axial thrashing or straw reducing machine the combination of a rotor including a plurality of rotary beaters and a casing for said rotor, said casing having a part with apertures formed therein for the passage of the grain and so formed that they act as air nozzles through which air may be drawn into the casing.

50. In an axial thrashing or straw reducing machine the combination of a rotor including a plurality of rotary beaters, a casing having stationary cooperating beating elements thereon and an end disc closure for the exit end of the casing, with an annular exit formed between the disc and the casing.

In testimony whereof, I have signed my name to this specification.

FELIX SCHLAYER.

Certificate of Correction

Patent No. 1,744,335. Granted January 21, 1930, to

FELIX SCHLAYER

It is hereby certified that error appears in the printed specification of the above numbered patent requiring correction as follows: Page 1, line 29, for the misspelled word "resticting" read *restricting;* lines 38 and 39, strike out the comma and words ", and other objects thereof will hereinafter appear" and insert the same to follow after the word "machine" in line 42; page 2, line 19, for the words "centre line" read *medial plane;* same page, line 35, for the word "art" read *are;* and line 126, for "80" read *80²;* page 9, line 10, claim 33, for the word "thrashed" read *threshing;* and line 14, before the word "reduced" insert the words *threshed or;* and that the said Letters Patent should be read with these corrections therein that the same may conform to the record of the case in the Patent Office.

Signed and sealed this 11th day of March, A. D. 1930.

[SEAL.]

M. J. MOORE,
*Acting Commissioner of Patents.*